UNITED STATES PATENT OFFICE.

JAMES G. STEELE, OF SAN FRANCISCO, CALIFORNIA.

IMPROVEMENT IN PROCESSES OF MAKING POISONOUS COMPOSITIONS FOR DESTROYING GOPHERS, SQUIRRELS, &c.

Specification forming part of Letters Patent No. 168,935, dated October 19, 1875; application filed August 5, 1875.

*To all whom it may concern:*

Be it known that I, JAMES G. STEELE, of the city and county of San Francisco, State of California, have invented a new and useful Process for Manufacturing a Poisonous Composition for the Destruction of Squirrels, Rats, Gophers, and other like animals, of which the following is a specification:

This invention relates to that class of processes employed for manufacturing a poisonous composition for the destruction of squirrels, rats, gophers, and other like animals; and it consists in partially softening wheat, with the aid of a limited quantity of water and heat, in a hot-water bath apparatus, and then saturating or charging the same with a solution of sulphate of strychnine and corrosive sublimate, and then incorporating with the wheat so saturated or charged a mixture of granulated sugar and wheat flour, with the aid of heat.

To carry out this my invention, one hundred and twenty-five pounds of cleaned wheat are taken and introduced into a hot-water bath apparatus, moistened with two quarts of water, covered, and allowed to remain at a heat not to exceed 240° Fahrenheit, for fifteen minutes. Four ounces of the sulphate of strychnine are now taken and mixed with three pints of distilled water and enough strong acetic acid added to insure a perfect solution, which is effected by the aid of heat. The resulting liquid is immediately mixed with the wheat, and then a solution made by dissolving sixteen ounces of corrosive sublimate in three pints of boiling distilled water is added, and the whole is then vigorously stirred with a wooden spatula, and allowed to remain at a heat of 180° for fifteen minutes, with continued agitation. Twelve and a half pounds of white sugar are next carefully granulated at a heat not to exceed 140°, mixed intimately with five pounds of wheat flour, and passed through a sieve of thirty meshes to the inch, which process is repeated three times, when a perfect mixture will be formed. This is now added to the mixture of wheat and strychnine above mentioned, the whole thoroughly incorporated together and allowed to remain at a heat of 240° until a thorough mixture has been formed and the poisoned kernels of wheat are well and uniformly covered with the mixture of flour and sugar. The whole is now removed from the fire, spread upon suitable trays, and allowed to dry at a temperature of 110°.

By this process, and the care used in the manipulation, the ingredients entering into the compound are protected from undue heat and exposure to the influences of the air, the compound is rendered uniform in composition and quick and sure in the effect intended, and stable and permanent in any ordinary condition, whether covered or exposed to the usual influences of the atmosphere.

The submission of the wheat to the carefully-regulated heat of the hot-water bath apparatus prevents burning or destroying the grain, and yet allows enough heat to be applied to cause the germinating principle contained therein to be destroyed.

The temperature of the water-bath, together with the influence of the small quantity of water added to the wheat, causes a slight expansion and softening of the grain, which disposes it to quickly and thoroughly absorb the poison when presented to it in the manner described.

The strychnine is used in the more soluble form of sulphate, and the perfect solution effected by the agency of the acetic acid is rapidly absorbed by the wheat granules, which have been prepared for its reception as above.

The addition of the corrosive sublimate, which is also rapidly and thoroughly absorbed by the wheat, strengthens the poisonous nature of the compound and causes it to act with more fatal energy.

Upon the addition of the mixture of sugar and flour, the wheat immediately attaches itself to it and becomes coated therewith, thus being, when dried as described, protected from the influence of the air, every grain being also distinct and separate from its fellow, and presenting an attractive and toothsome morsel to the animals which it is intended to destroy.

Contemporaneous with this I have made application for a patent for the composition which is the result of this process.

I claim as my invention—

The process, without soaking, of partially softening the wheat in a hot-water bath apparatus, by means of a limited quantity of water and heat, so that, without burning or destroying the grain, the germinating principle within it is destroyed, and at the same time the grain does not become soaked but rendered highly absorbent of the solutions to be presented to it; and then charging or saturating the wheat so prepared and while warm with solutions of sulphate of strychnine and corrosive sublimate, and then incorporating with it and covering it by the aid of heat, with a mixture of granulated sugar and flour, all substantially as described.

JAMES G. STEELE.

Witnesses:
  LORENZO D. LATIMER,
  EDWARD LAUDE.